Figure 1:
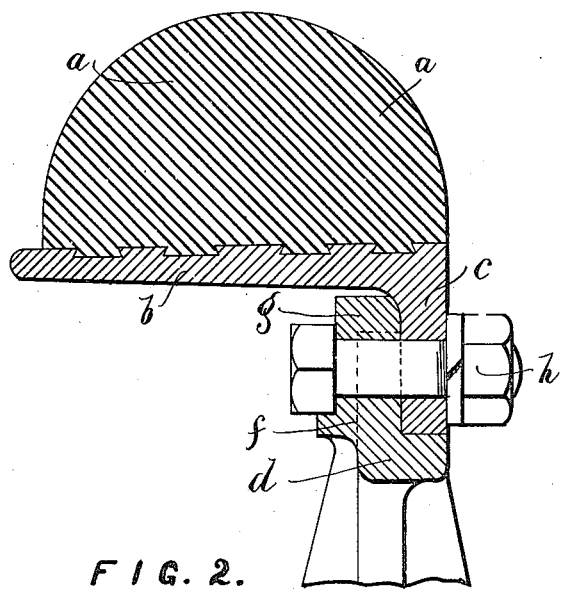

A. C. STEVENSON.
RIM AND WHEEL FOR SOLID RUBBER TIRES.
APPLICATION FILED JAN. 7, 1913.

1,230,616.

Patented June 19, 1917.
4 SHEETS—SHEET 1.

WITNESSES

INVENTOR
Andrew Creery Stevenson
By Howson and Howson
Attorneys

A. C. STEVENSON.
RIM AND WHEEL FOR SOLID RUBBER TIRES.
APPLICATION FILED JAN. 7, 1913.

1,230,616.

Patented June 19, 1917.
4 SHEETS—SHEET 2.

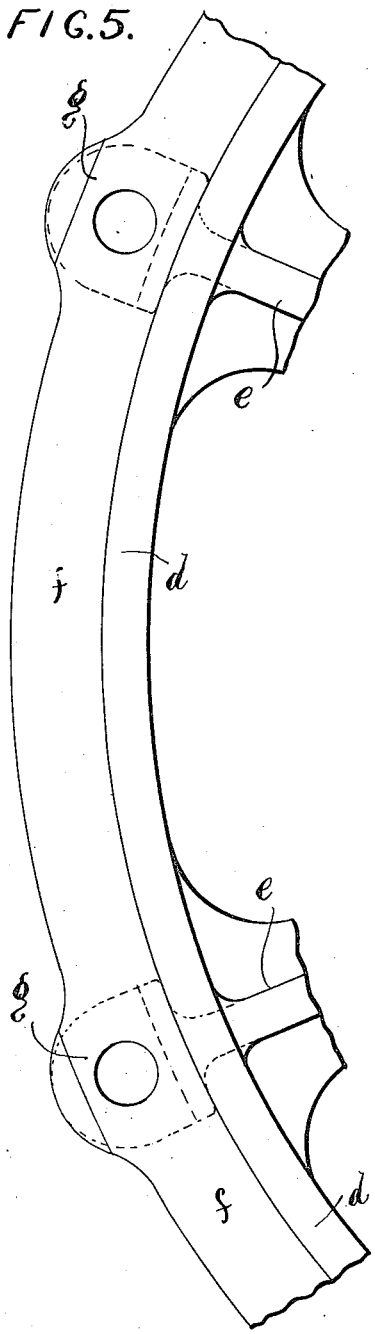
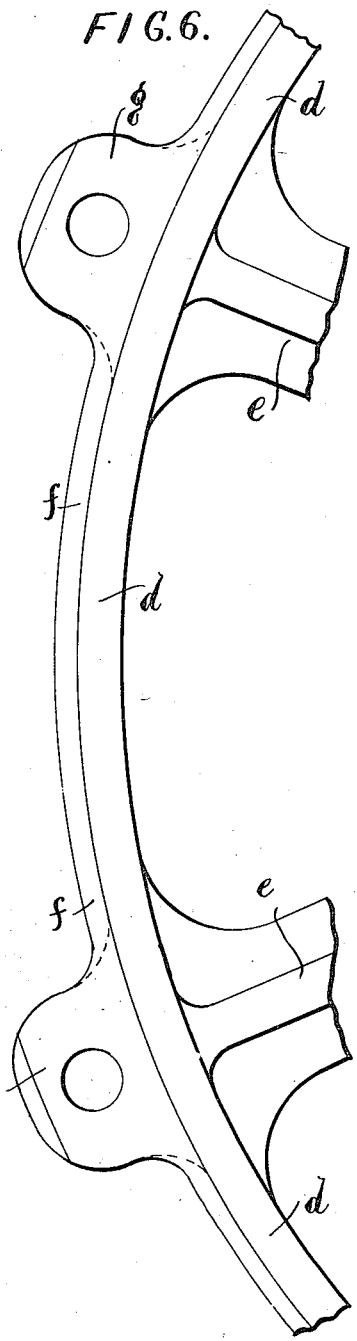

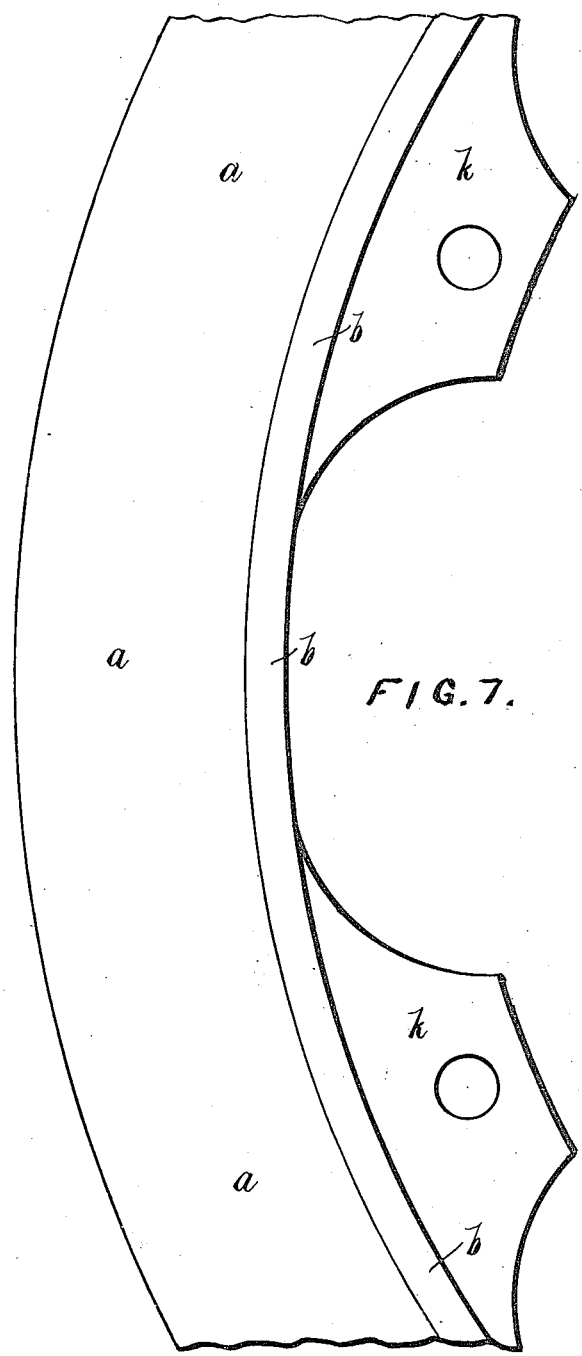
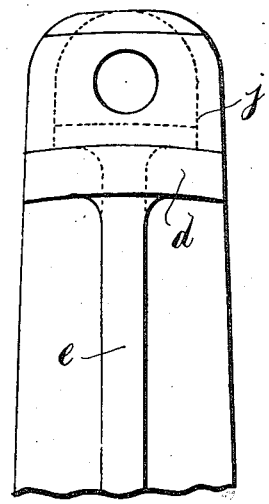
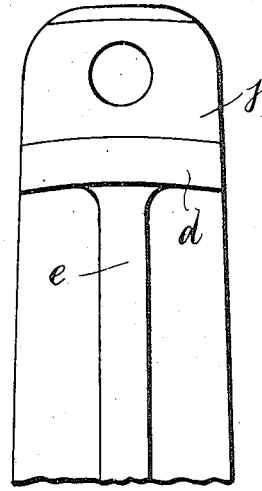

UNITED STATES PATENT OFFICE.

ANDREW CREERY STEVENSON, OF SCOTSTOUN, GLASGOW, SCOTLAND.

RIM AND WHEEL FOR SOLID-RUBBER TIRES.

1,230,616. Specification of Letters Patent. Patented June 19, 1917.

Application filed January 7, 1913. Serial No. 740,620.

*To all whom it may concern:*

Be it known that I, ANDREW CREERY STEVENSON, a subject of the King of Great Britain and Ireland, and a resident of Scotstoun, Glasgow, Scotland, have invented certain new and useful Improvements in Rims and Wheels for Solid-Rubber Tires, of which the following is the specification.

Solid rubber tires of the band type—that is of the type vulcanized upon and thereby interlocked with an endless metal band—have heretofore been secured upon the wheel rim by various devices all involving considerable added weight, many decidedly complex, and most such that with twin tires the inner tire cannot be completely removed unless the wheel first be removed.

The invention has for its object to provide a novel means of securing tires of this type upon the wheel in which these various disabilities are avoided and in which weight therefore is much reduced, the parts are exceedingly simple, and in the case of twin tires both may be removed at one side of the wheel.

Firstly, in carrying out the invention the wheel is preferably of metal and it is not in the ordinary sense provided with a rim. That is to say, it has not a peripheral member wide enough to receive a tire. Instead, it has either a peripheral flange joining the spoke ends and of only sufficient thickness for strength. Or even this is avoided and the spokes terminate in paws arranged in a plane of rotation and for a purpose hereinafter set forth.

Secondly, the band upon which the tire is vulcanized, while as heretofore of the same, or approximately the same width as the tire, is made sufficiently strong to take the load, driving, and other stresses. Thus the usual rim heretofore used as a reinforcement behind the band of the tire is dispensed with.

From this strengthened band or rim upon which the tire is vulcanized there extends inward in a plane of rotation either a flange or a series of lugs in a manner known in other constructions. This flange, or these lugs, is or are adapted to engage either the peripheral flange joining the spokes or the paws hereinbefore referred to upon the spoke ends.

The parts are secured together by bolts passed through apertures in the flanges, in flange and lugs, in paws and flange, or in lugs and paws as the case may be—or other equivalent securing means may be used. The flanges, lugs, or paws, are counterpartly checked into one another for centering purposes.

The rim lugs, or flange, may be in any convenient position in the width of the rim, their position being preferably such relatively to the flange or paws upon the spokes that the tread of the tire is perpendicular to the center or effective center of the wheel hub and to the road. In the case of twin tires, the flanges or lugs may be at opposite sides of the two rims and may be abutting one another.

The outer surfaces of the band rims and which receive the tires may be fashioned in any of the well-known manners which secure interlocking of the vulcanized tire with the rim.

In order that the invention and the manner of performing the same may be properly understood, there are hereunto appended four sheets of explanatory drawings, illustrative in Figures 1, 2, 3 and 4 Sheets 1 and 2 in vertical section respectively an example of wheel and rim with a single tire, a similar example with twin tires, a second single tire example, and a second twin tire example, while in Figs. 5 and 6 Sheet 3 are shown in side elevation two examples of wheel members, in Fig. 7, Sheet 4, in side elevation an example of rim with its tire, and in Figs. 8 and 9 also in side elevation examples of wheel members having paw-ended spokes.

In the example shown in Fig. 1 the tire $a$ is mounted and vulcanized upon a rim $b$ of sufficient strength to take the load, driving, and other stresses. From one edge of this rim $b$ there extends inward a flange $c$ adapted to engage a peripheral flange $d$ joining the spokes $e$ of the wheel member, this flange and spoke arrangement being shown in side elevation in Fig. 5. A web $f$ rises from one side of the flange $d$ and is enlarged into lugs $g$ to receive bolts $h$ which secure the flanges $c$, $d$, together, that is, secure the rim with its tire upon the wheel member. There are thus formed by the inner edge of the flange $c$, the surface of the flange $d$, and the face of the web $f$, counterpart checks for centering purposes.

Figure 2:
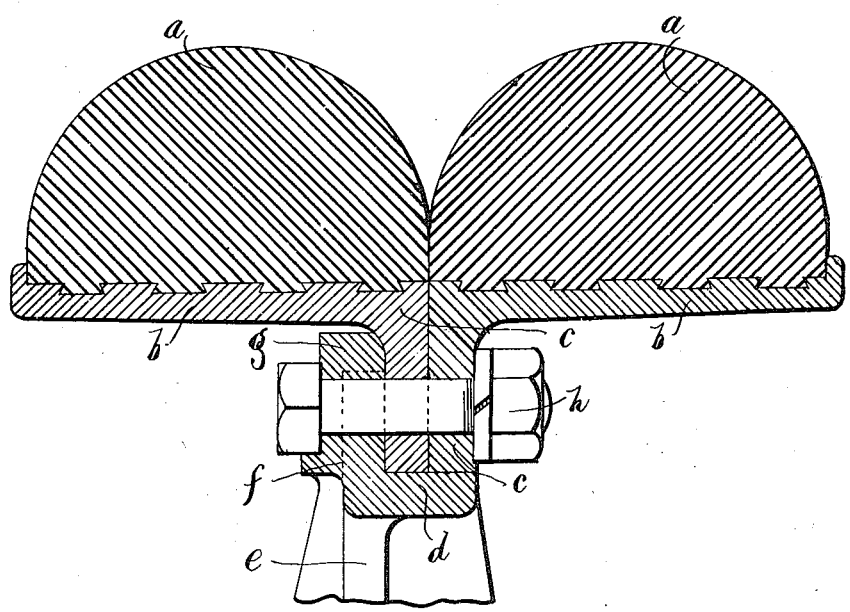
Figure 3:
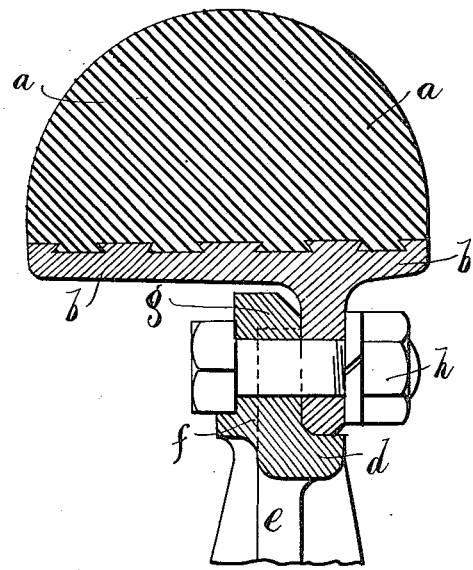

The example shown in Fig. 2 only differs from that just described in that the flange $d$ is made wide enough to receive the two flanges c upon opposite sides of the rims b of two tires.

The example shown in Fig. 3 again only differs in that the flange c is not at one edge of the rim b. As has already been explained, this flange may be in any position across the rim b, its position in a particular case being determined by the form of the wheel hub.

Figure 4:
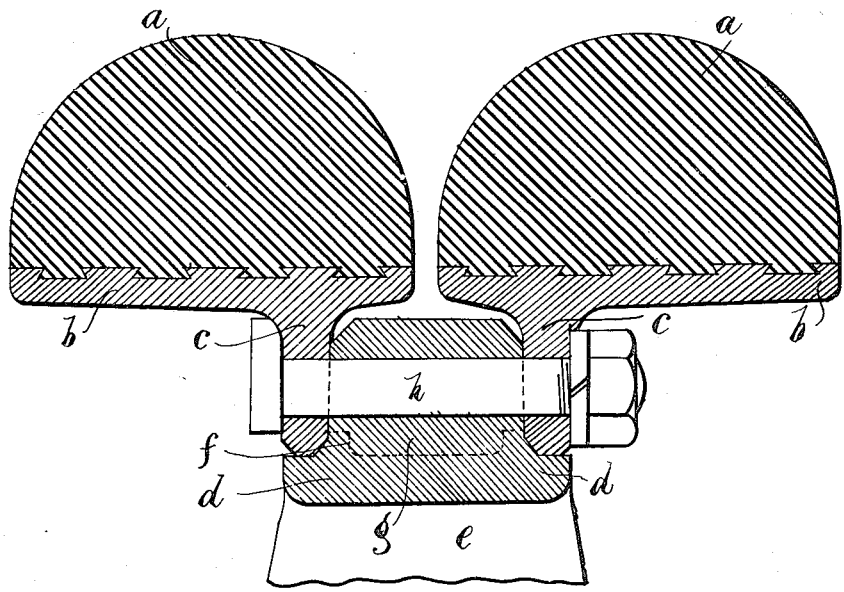

In Fig. 4 is shown an example of twin tire device in which these flanges c are set in from the edge of the rim. In this case, the lugs or bosses g to receive the bolts h are of necessity wider, and there are two flanges d to receive the flanges c. This construction of wheel member is shown in Fig. 6.

Instead of either of the forms of wheel member shown in which there are flanges d continuous around the wheel, the ends of the spokes e may be formed into paws j checked to receive and center the rim flanges c and pierced for the bolts securing them as shown in Figs. 8 and 9—this construction being suitable only for light loads.

Again, instead of there being a flange c continuous around the rim b, there may, as shown in Fig. 7, be formed around that rim a series of inwardly projecting lugs k taking its place, spaced to correspond with the flange lugs g or spoke paws j, and conforming at their inner edges to make joints for centering with the flanges d or equivalents. This construction of rim and lugs is more particularly of advantage in examples such as that shown in Fig. 4, in that with its aid (and gaps being provided in the webs f) both tires may be removed from one side, the inner being turned until the lugs k clear the lugs g. Thus to remove the tires it is unnecessary to remove the wheel from the axle.

In order to protect the sides of the tire from damage, the edges of the rims b may project at one or both sides beyond them (Fig. 1) and as shown in Fig. 2 may be outturned.

What I claim is:—

1. A wheel of the character described having spokes, the solid outer ends of which are recessed on the side adjacent the chassis to form supporting ledges in combination with a tire-carrying rim having an internal diameter exceeding the overall diameter of the wheel spokes so that it does not bear thereon, and having inwardly-projecting integral bracket-like lugs adapted to pass between adjacent spokes and be rotated in the plane of the wheel to seated position on the supporting spoke ledges on the side of the wheel adjacent the chassis without dismounting the wheel from its axle.

2. A wheel of the character described having spokes the solid outer ends of which are recessed to form supporting ledges in combination with a tire carrying rim having an internal diameter exceeding the overall diameter of the wheel spokes so that it does not bear thereon and having inwardly-projecting integral bracket-like lugs adapted to pass between adjacent spokes and be rotated in the plane of the wheel to seated position in the plane of the wheel to seated position on the supporting spoke ledges without dismounting the wheel from its axle.

3. A wheel of the character described having spokes, the solid outer ends of which are recessed on opposite sides to form supporting ledges, in combination with independent tire-carrying rims seated on said ledges at least one of said rims having an internal diameter exceeding the overall diameter of the wheel spokes so that it does not bear thereon, and having inwardly projecting bracket-like lugs adapted to pass between adjacent spokes and be rotated in the plane of the wheel to seated position on the supporting spoke ledges on the side of the wheel adjacent the chassis without dismounting the wheel from its axle and means common to said rims for securing the same to said spokes, substantially as described.

4. A wheel of the character described having spokes, the solid outer ends of which are offset to form supporting ledges, in combination with independent tire carrying rims having internal diameters exceeding the overall diameter of the wheel spokes and having inwardly projecting lugs adapted to be seated on the spoke ledges, said rims projecting respectively on opposite sides of the mid-plane of the wheel, and means at each spoke and common to both rims for securing the latter to the spoke.

5. A wheel of the character described having spokes, the solid outer ends of which are offset to form supporting ledges on opposite faces of the spokes, in combination with independent tire-carrying rims having lugs seated on said spoke ledges, one of said rims having an internal diameter exceeding the overall diameter of the wheel spokes and the lugs on which are adapted to pass between adjacent spokes and be rotated in the plane of the wheel into seated position on the spoke ledges on the side of the wheel adjacent the chassis, together with bolts common to the lugs of both rims and passing through the spoke ends to hold said rims in seated position on the spoke ledges, substantially as described.

6. A wheel of the character described having a hub section having rim-receiving means fixed with relation thereto, said means comprising supporting ledge means spaced radially inward from the peripheral portions of said hub section, in combination with an independent tire-carrying rim having an internal diameter exceeding the overall diameter of the hub section and having inwardly projecting supporting lugs adapted to be seated on the supporting ledge means, together with bolts piercing said rim lugs and hub section at points radially outside the supporting ledge means and serving to hold said rim in seated position on said ledge means.

7. A wheel of the character described, having spokes the solid outer ends of which are offset to form supporting ledges spaced radially inward from the spoke ends, in combination with an independent tire-carrying rim having an internal diameter exceeding the overall diameter of the spokes and having inwardly projecting supporting lugs adapted to be seated on said spoke ledges, together with bolts piercing the rim lugs and the spoke ends at points radially outside the spoke ledges and serving to hold said rim in seated position on said ledges.

8. A wheel of the character described, having spokes the solid outer ends of which are offset to form supporting ledges spaced radially inward from the spoke ends, in combination with an independent tire-carrying rim having an internal diameter exceeding the overall diameter of the spokes and having inwardly projecting supporting lugs lying to one side of the mid-plane of the wheel and adapted to be seated on said spoke ledges, together with bolts piercing the rim lugs and the spoke ends at points radially outside the spoke ledges and serving to hold said rim in seated position on said ledges.

9. A wheel of the character described having spokes the solid outer ends of which are offset on opposite sides to form supporting ledges spaced radially inward from the spoke ends, in combination with a pair of independent tire-carrying rims each having an internal diameter exceeding the overall diameter of the spokes and also having inwardly projecting supporting lugs adapted to be seated on said ledges, one rim on each side of the wheel, together with bolts piercing the rim lugs and spoke ends at points radially outside the spoke ledges and serving to hold said rims in seated position on the ledges.

10. A wheel of the character described having spokes the solid outer ends of which are offset on the side adjacent the chassis to form supporting ledges spaced radially inward from the spoke ends, in combination with an independent tire-carrying rim having an internal diameter exceeding the overall diameter of the spokes and having inwardly projecting supporting lugs adapted to pass between adjacent spokes and be rotated in the plane of the wheel into seated position on the spoke ledges on the side of the wheel adjacent the chassis, together with bolts piercing the rim lugs and spoke ends at points radially outside the spoke ledges and serving to hold the rim in seated position on the ledges.

In testimony whereof I have signed my name to this specification, in the presence of two subscribing witnesses.

ANDREW CREERY STEVENSON.

Witnesses:
DAVID FERGUSON,
WILFRED HUNLY.